United States Patent [19]

Hufstetler

[11] Patent Number: 4,847,468
[45] Date of Patent: Jul. 11, 1989

[54] AUTOMOTIVE PRE-HEATER

[76] Inventor: Glen Hufstetler, 815-11th St. East, P.O. Box 1023, Kalispell, Mont. 59903

[21] Appl. No.: 86,825

[22] Filed: Aug. 19, 1987

[51] Int. Cl.[4] .............................................. B60L 1/02
[52] U.S. Cl. .................................. 219/203; 219/207; 237/12.3 A; 237/12.3 R; 165/41
[58] Field of Search ...................... 237/12.3 A, 12.3 B, 237/2 A; 219/202, 204, 364, 203, 207, 208; 98/2.05; 165/41, 42

[56] References Cited

U.S. PATENT DOCUMENTS

| 2,067,102 | 1/1937 | Simon. | |
|---|---|---|---|
| 2,654,826 | 10/1953 | Spurlin. | |
| 2,717,305 | 9/1955 | Guthrie. | |
| 2,819,373 | 1/1958 | Allman. | |
| 3,213,994 | 10/1965 | Hohler. | |
| 3,313,915 | 4/1967 | Chamberlain | 237/12.3 A X |
| 3,673,379 | 6/1972 | Eversull. | |
| 3,870,855 | 3/1975 | Edlund et al. | |
| 4,034,204 | 7/1977 | Windsor et al. | 237/12.3 A X |
| 4,293,759 | 10/1981 | Higgins | 219/202 |

Primary Examiner—Henry A. Bennet
Attorney, Agent, or Firm—Keith S. Bergman

[57] ABSTRACT

An automotive pre-heater is set forth for use in cold climates for warming the interior and selective portions of an automobile prior to starting and operation. A compact housing secured by conventional bracketry to the interior of an automobile is provided. Fan means operated by a programmable timing element provide warmth to the interior of an automobile. Optional heating outlets are provided to further enable pre-warming of selected automobile portions such as the carburetor, battery, and engine block. A windshield defrosting conduit is provided to enable windshield defrosting. The pre-heater is powered electrically from a power source external of the automobile.

3 Claims, 2 Drawing Sheets

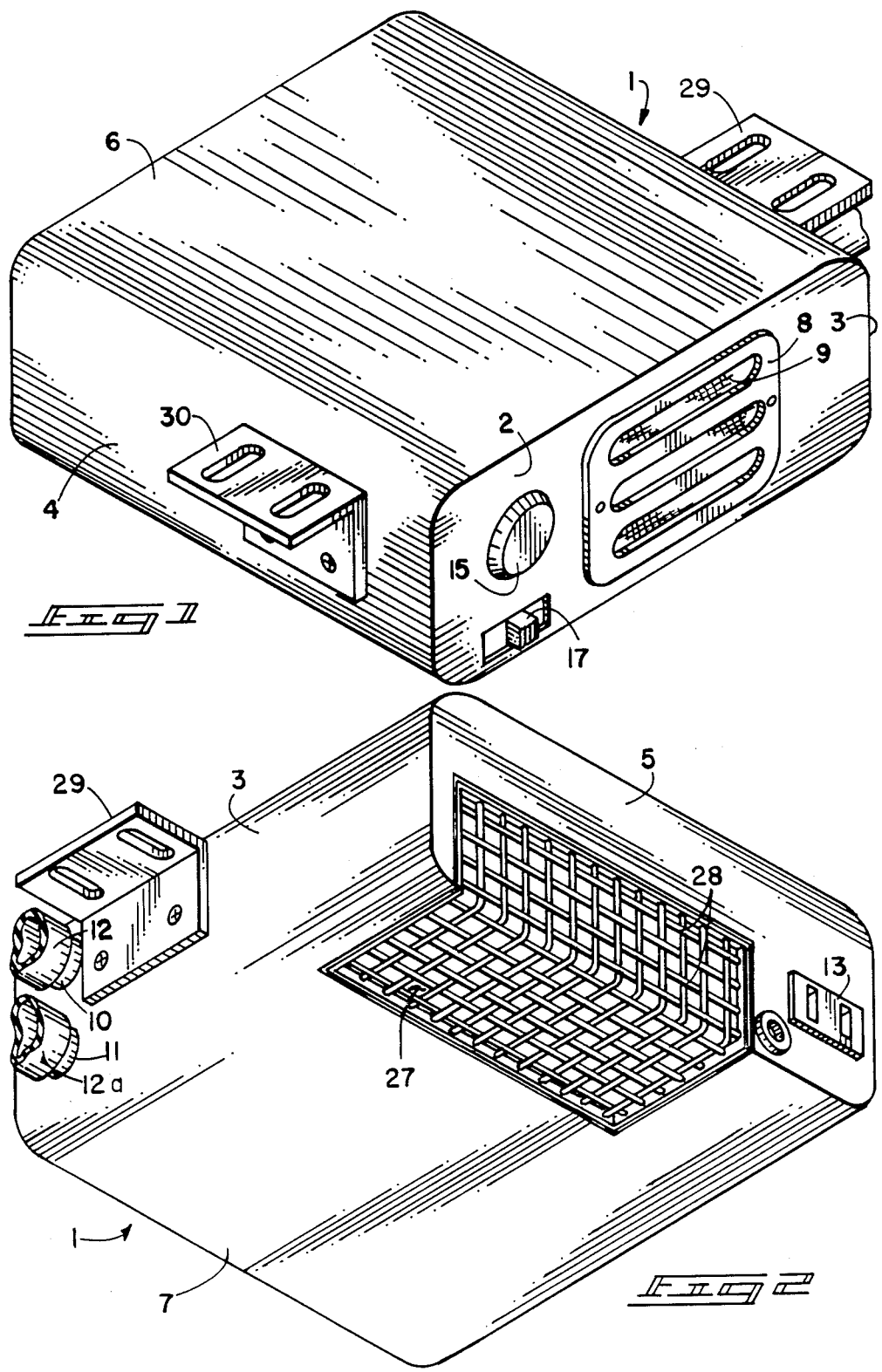

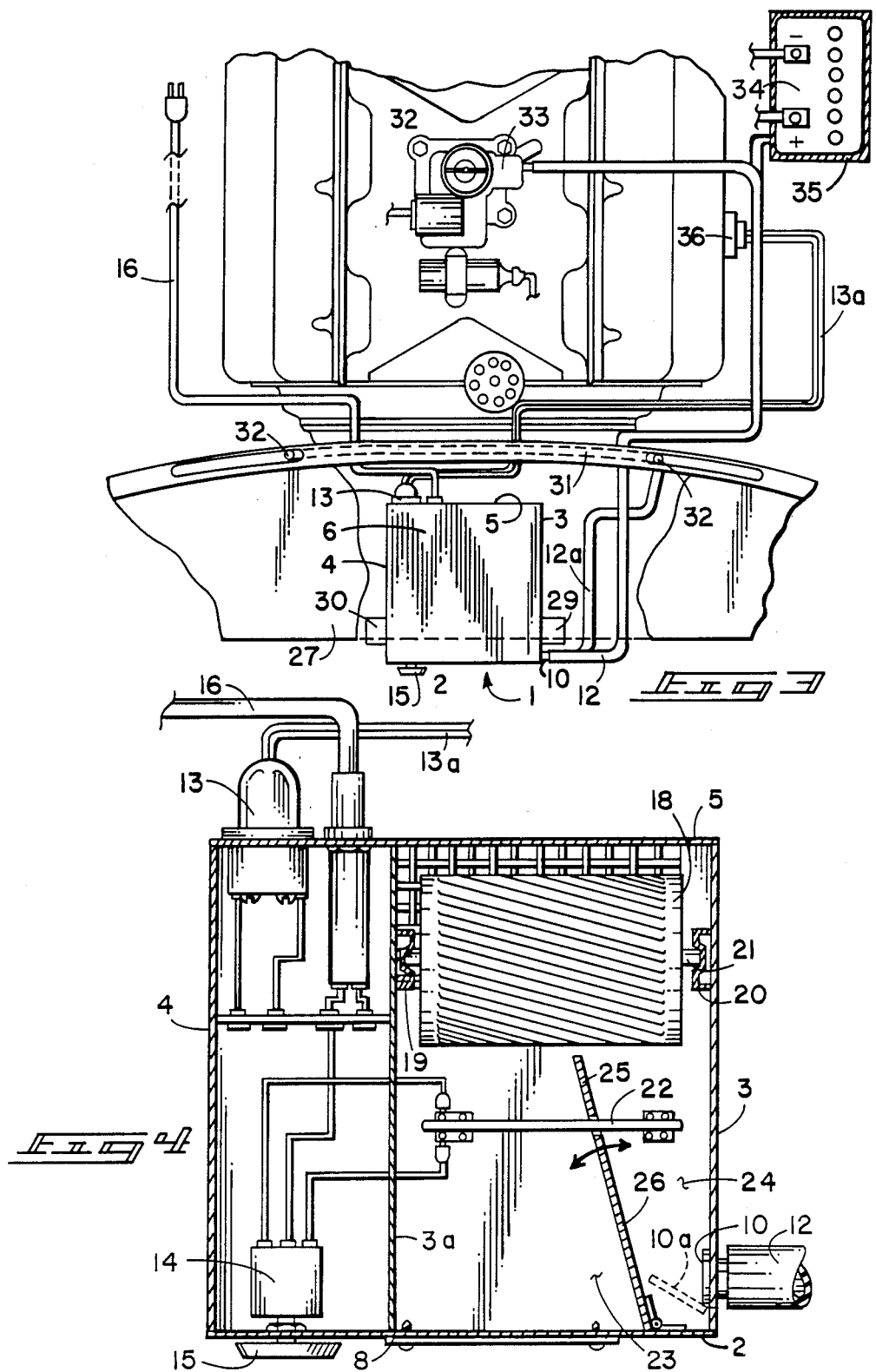

AUTOMOTIVE PRE-HEATER

BACKGROUND OF INVENTION

A. Related Applications

There are no applications for patent relating hereto heretofore filed in this or any foreign country.

FIELD OF INVENTION

My invention is related generally to automobile pre-heaters and more particularly to a compact pre-heater powered externally of the serviced automobile to warm the interior and other selected portions.

BACKGROUND AND PRIOR ART

Automotive pre-heaters are known and used in various parts of the United States, particularly across the Northern tier, where winter conditions induce many automobile owners to utilize such devices of various sorts to ease physical discomfort and mechanical malfunctions associated with winter conditions.

Prior art devices have included various mechanisms for warming of selected portions of an automobile. Typically engine heaters are designed to utilize conventional household current to prevent freezing of an engine water jacket and simultaneously maintain engine oil at suitable temperatures for easier automotive start-up and improved lubrication during start-up. Further, prior art devices have provided various heating apparatus for warming an automobile interior to minimize operator discomfort during cold and wintry conditions. Use of timer devices has been incorporated into this apparatus to activate heaters and limit energy consumption of such devices to time frames immediately prior to automotive usage.

While the prior art devices have made progress in alleviating operator discomfort associated with winter automotive usage, they have heretofore generally failed to provide a cooperatively interrelated assembly enabling an automotive operator to enjoy both immediate comfortable access and effective usage of an automobile during wintry weather conditions. As the internal combustion engine typically utilized by contemporary automobiles is subject to easier starting, more efficient operation, and prolonged engine life when various portions are pre-heated, a need has persisted to provide this function.

While some preheating devices have attempted to warm interiors of automobiles and simultaneously provide associated warming of other automotive components, shortcomings have prevailed. Frequently, due to weather conditions, frost build-up develops upon windshield surfaces and a user is involuntarily subjected to adverse weather conditions in mechanically or chemically removing such frost. Furthermore, electric output of an automobile battery is directly related to its temperature and is accordingly reduced during periods of cold temperatures. Fuel in a carburetor becomes less volatile as ambient temperature is reduced and if water becomes introduced into the fuel system by way of contamination, it tends to crystalize during freezing temperatures and prevent usage of the automobile because fuel passage may be restricted in a carburetor. These temperature related problems may eventually be overcome by persistence of an automobile user, but only after significant physical effort and increased abuse of automobile components. My invention seeks to alleviate these problems.

To this end, I have developed a compact, effective, and simplified automotive pre-heating device that overcomes deficiencies associated with prior art devices of this type. A novel heater box contains a heating element and associated fan that develop sufficient heated air to distribute that heat not only to an automobile's interior but also through appropriately associated conduits to a carburetor for proper fuel pre-heating, to an automobile battery to raise its temperature to increase potential power output, and to an automobile windshield to defrost it. An electrical outlet connects an engine head bolt heater of conventional manufacture to maintain engine temperature at desired levels. Operative electric power is provided through a timing switch from an external source, such as a residential dwelling.

Conventional bracketry is utilized to secure my automotive pre-heater to a convenient location selected within the automobile. Typically such location would include the underside of an automotive dashboard, the fire wall between auto interior and motor, or the space underneath a forward seat, if such space allows this placement.

Prior art devices have provided one or more of these functions individually, but have not provided all of them in any single combination. Most pre-heaters have been powered by a vehicle's electric system which only exacerbates its already weakened condition. Other preheating devices that have been powered externally of a vehicle have generally heated mechanical systems of a vehicle motor and have not been concerned with heating of the passenger compartment or windshield, as no heating system operating independently of the vehicular system which is powered from motor-produced thermal energy has been provided. Again, commonly, either aforedescribed type of heating system has operated continuously without benefit of switching or, if switched, has not provided a time oriented switching means to allow functioning only for a predetermined period immediately prior to vehicle use. Prior devices that have provided interior space heating have generally been large, cumbersome, and of a portable nature whereas my device is compact and may be readily attached in unobtrusive position in existing vehicular structures. My space heater also allows heated air to warm both battery and carburetor, whereas prior heaters associated with the motor mechanism were generally of the electrical resistive type that heated only the motor block, commonly through the fluids carried therein.

My invention resides not in any one of these features per se, but rather in the particular combination of all of its structures, and the function necessarily flowing therefrom, as herein disclosed and claimed and it is distinguished from the prior art in this entire combination.

SUMMARY OF INVENTION

A compact housing unit contains a switched power supply that, through a variable timing device, provides power at a pre-selected interval. An electrical outlet housing attaches a heater assembly to pre-heat the automotive engine. A fan member positioned within this housing directs air over a heating element to provide heated air to two chambers. A first chamber distributes the heated air to an automobile interior and a second chamber provides heated air selectively to automotive components including the battery, carburetor, and windshield surface.

In creating such a device, it is:

A principal object of my invention to create an automotive pre-heater that is powered by an energy source external of an automobile to provide heat to the automotive interior, selected components of the automotive engine, and the interior surface of an automobile windshield.

A further object of my invention to provide such a pre-heater that has an electrical outlet to supply power to an engine block heating device.

A still further object of my invention to provide such an automotive pre-heater that is of compact construction and houses a fan-like element to direct air over a heating element and distribute that heated air through plural conduits to various portions of an engine, automotive interior, and windshield.

A still further object of my invention to provide activation for the automotive pre-heating apparatus at predetermined periods and for predetermined periods thereafter by means of a timing device.

A still further object of my invention to provide such an automotive pre-heating device that is of new and novel design, of rugged and durable nature, of simple and economic manufacture, and one otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one practical and preferred embodiment being illustrated in the accompanying drawings, as is required.

BRIEF DESCRIPTION OF DRAWINGS

In the accompanying drawings which form a part hereof and wherein like numbers of references referred to similar parts throughout:

FIG. 1 is an isometric surface view of the upper portion of my invention showing various of its parts, their configuration and relationship.

FIG. 2 is an isometric surface view of the lower portion of my invention illustrating the same features from this aspect.

FIG. 3 is a partial, cut-away, top orthographic view illustrating, in somewhat diagramatic fashion, my automotive pre-heater operatively positioned within an automotive environment.

FIG. 4 is a top orthographic view of my invention, in a cut-away section, to show various internal parts, their configuration, and relationship.

DESCRIPTION OF THE PREFERRED EMBODIMENT

My invention generally provides box-like automotive pre-heater assembly housing to direct pre-heated air to an automotive interior, a windshield surface area, and pre-selected engine components to pre-heat all such elements during periods of cold weather.

My automotive pre-heater 1 is illustrated in FIG. 1 where it is seen to provide a compact housing structure including forward face 2, side faces 3 and 4, rear face 5, top 6 and lowermost surface 7. The housing structure illustrated is configured for convenience of mounting and is capable of geometric variations to accommodate economy of manufacture and available space within an automobile assembly. The several elements of my housing may be separately formed and subsequently structurally joined by mechanical fasteners, adhesives, welding or other commercially known assembly techniques. The housing is securable to an automobile structure by plural opposed brackets 29, 30, carried on sides 3, 4.

Secured to housing forward face 2, overlying an appropriately configured air outlet opening, is grill plate 8 formed with conventional grill cloth material 9 sandwiched between adjacent peripheral surfaces of the grill plate and forward face 2 enabling flow of heated air therethrough to an automotive interior or passenger compartment. Grill cloth of this type is commercially available. The mesh size should be of a relatively open weave and the cloth should be formed of a heat resistant material. While the grill cloth may be optionally deleted in use with my invention, its use is desirable in limiting dust and foreign matter from circulating within the interior of my pre-heater assembly or a serviced vehicle. The cloth further may be removed periodically for cleaning as needed.

Integrally secured to first side 3 is a pair of ports 10 and 11 to accommodate direction heated air, as described in further detail in a later portion of this specification. Knockout plugs 10a, illustrated in phantom outline in FIG. 4, are positioned in displaceable relationship to first and second ports 10 and 11 enabling selective and optional use of said ports in accommodating pre-heated air passage to pre-heat desired component portions of an automobile. First and second heat transport conduits 12 and 12a are firmly securable to respective ports 10 and 11 for transport of heated air generated by my invention.

Positioned on rear face 5 of my pre-heater is electric outlet 13 for acceptance and powering of accessory items. An engine head bolt heater, as commonly used in cold environs, may have its cord routed through an automobile's firewall with its heating element secured integrally into an automobile engine for pre-heating of the block according to the common usage of such devices. For illustrative purposes, heater cord 13a is illustrated as having a typical electrical plug for use with outlet 13, however, this is for convenience only, as clearly a head bolt heater may be electrically wired integrally to pre-heater 1, if desired. Since heating elements of such head bolt heaters tend to burn out after a period of time, it is advantageous to have the heater configured for replacement such as by the conventional outlet and plug arrangement illustrated.

Rear face 5 and the adjacent portion of lower mount surface 7 of the housing of my pre-heater define air input orifice 27 covered by grill 28 to prevent accidental access and possible resultant damage or injury. It is to be noted that the air input through orifice 27 will be from within the interior of am automobile rather from its exterior to ultimately cause reheating of heated air within an automobile interior and avoid heat waste.

Outlet 13 is typically arranged electrically in my pre-heater to provide electricity independently of timing circuitry, but alternatively a switching mechanism (not shown) may be incorporated in my invention to selectively activate the outlet 13. The non-switched outlet is normally desirable to maintain continuous current to the head bolt heater, as the mass of a typical automotive engine would resist warming in a limited time frame provided by a timed operation, and secondly, freezing of the engine water jacket may occur if continuous heating is not available to prevent the happening.

Electric power is supplied to the various elements of my pre-heater 1 through power supply cord 16 that delivers power from a conventional power supply source (not shown). My automotive pre-heater assembly 1 may be adapted to accommodate various desired electrical output sources, but preferably it is designed to accommodate 110 volt, single phase "house current" which is most commonly found in use.

Electric power input to my invention is controlled through series connected timer device 14 operated by associated rotary timer dial 15. Rotary dial 15 preferably is based on a twenty-four hour time cycle whereby, upon setting dial 15 to activate my invention at a desired time, power for the various components will be provided through switching within the timer device at a particular predetermined time and preferably for a predetermined period. Details of timer device 14 are not set forth as such devices and their operation in electrical circuits are conventional and well known in the art.

Timing device 14 and associated dial 15 are positioned on forward face 2 of the pre-heater housing for convenient access by a user. Switch 17, in the instance illustrated is of a slide type heretofore well known, is provided to allow power to my automotive pre-heater to be manually halted as an override alternative to timing device 14.

FIG. 4 illustrates the cylinder of blower fan 18, of conventional "squirrel cage" construction, and its position within the confines of pre-heater 1. Axle 21 is axially aligned and structurally carried in cylinder 18 of the fan and in turn is journaled at either end in bearing members 19 and 20 carried by the pre-heater housing member to rotatably mount and locate the fan within that pre-heater housing member. Positioned downstream of blower fan 18 is elongate electrically powered resistance heating element 22. This resistance heating element is of conventional "ribbon" type configuration and of a length to substantially span the distance between first side wall 3 and interior dividing wall 3a of the housing to effectively heat a flow of air generated by the blower fan. A divider wall, formed of elements 25 and 26 as rear and forward portions, directs heated air into chambers 23 and 24, in a forward portion of my pre-heater assembly. Accordingly, forced heated air from first heat chamber 23, will be directed through grill cloth 9 and into an automotive interior, while heated air from second heat chamber 24 will be directed to first and second ports 10 and 11. Forward and rearward deflectors 26 and 25 preferably are adjustably positionable relative to the housing supporting them to allow apportionment of air flow to respective chambers 23 and 24, as desired. Circumstances may dictate that a larger proportion of heated air be directed to one or the other of the output systems and accordingly means (not shown) may be provided to adjustably secure deflectors 25 and 26 to enable their adjustable repositioning.

FIGS. 2 and 3 illustrate one port element 11 communicating by appropriate transport conduit 12a to provide heated air on a typical automotive windshield surface via outlets 32 defined within the defroster system. This can be accomplished in various ways, but one readily employed is to connect second heat transport conduit 12a directly into an existing defroster system of an automobile and thereby through existing automotive conduits 31 direct heated air to outlets 32 and thence onto the automobile windshield.

Heat transfer conduit 12 communicates from my pre-heater 1 into the engine compartment of a serviced automobile where heated air is directed to carburetor pre-heat housing 33 formed in surrounding relationship to carburetor body 32 and to a battery housing 35 to warm conventional automotive battery 34 prior to its use. Both carburetor and battery may be pre-heated from one transfer conduit by installing a "Y" connection into that conduit. Alternatively, additional ports may be provided in first side wall 3 of the pre-heater.

Head bolt heater 36, as illustrated in FIG. 3, is connected to outlet 13 by connecting line 13a whereby the head bold heater is supplied with power from an external source power (not shown) by supply cord 16. Head bolt heaters are conventionally positioned within an engine's water jacket to both prevent freezing of the liquid coolant housed therein as well as elevate engine block temperature to allow easier start-up and operation. Further, pre-warmed gasoline obtained by preheating of the fuel system enables the fuel to vaporize more readily for improved engine start-up. Pre-warming of the battery will also increase available power during automotive start-up as chemical activity in an ordinary battery is directly related to temperature.

It may be appreciated that my automotive pre-heater sets forth a cooperative, inter-related system to minimize automotive problems associated with winter conditions. Personal comfort is enhanced by direct defrosting of the windshield and heating of the automobile interior prior to operator use. Furthermore, the more temperature sensitive troublesome components of an automobile motor are pre-warmed to aid their operability and efficiency.

Use of my automotive pre-heater is easily understood. A user sets the desired time interval by means of rotary timer dial 15 to pre-select the operative cycle time of my device. Switch 17 is moved to the "on" position and timing mechanism 14 will accordingly actuate and energize my device as programmed. When actuated by establishing power through line 16, engine head bolt heater 36 will operate to pre-heat the engine block apart from the timing cycle. Heat transport conduit 12, when the pre-heater timing mechanism is activated, will elevate carburetor fuel temperature by means of carburetor pre-heat housing 33 for easier vaporization and atomization of fuel. Heat transport conduit 12a will pre-heat battery 34 within surrounding battery housing 35 and the automotive windshield will be defrosted by outlets 32 which provide heated air to the windshield. The automobile interior itself will be warmed by air directed through grill cloth 9 covering the orifice defined in forward face 2 of my pre-heater. An operator will therefore spend a minimum of time exposed to the elements and by merely disconnecting power supply source 16 may proceed with automobile operation without having to perform accessory functions such as spraying starting fluid in a carburetor, scraping a windshield of frost, or electrically charging a battery to improve its electrical power output.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thus described my invention, what I desire to protect by Letters Patent and what I claim is:

1. An automotive pre-heater assembly for heating an automobile interior and plural automotive component parts, in an automobile having a passenger chamber with a front seat, comprising, in combination:

an electrical power supply means external of an automobile to be serviced;

a timing member in series with the electrical power supply means to programmably enable electrical association between said external power supply means, a blower assembly and a heating element;

a heating element in series with the timing member; a blower assembly in series with the timing member and associated with the heating element to deliver heated air to a heat chamber;

a heat chamber carried in the passenger chamber forwardly of the front seat and having adjustably positionable deflecting means, dividing said heat chamber into a first portion for directing heated air therein to the passenger chamber of an automobile and a second portion for directing heated air therein to the automotive windshield and at least one second component of an automobile, said deflecting means allowing adjustment of relative amounts of heated air passing to each heat chamber portion; and means for attaching electrically operated auxiliary heating devices to provide power thereto, independently of said timing member.

2. An automotive pre-heater assembly as set forth in claim 1 further including a second heat transport conduit communicating from the second portion of the heat chamber to direct heated air to an automotive carburetor.

3. An automotive pre-heater assembly as set forth in claim 1 further including a second heat transport conduit communicating from the second portion of the heat chamber to direct heated air to an automotive battery.

* * * * *